Dec. 28, 1937.    H. C. SHOCK    2,103,875
CUTTING MECHANISM
Filed Sept. 12, 1936
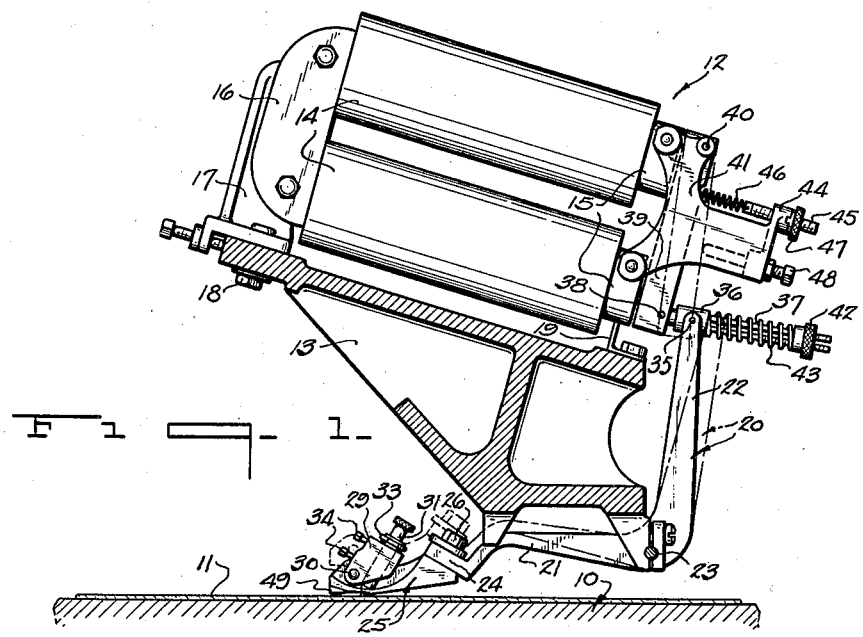
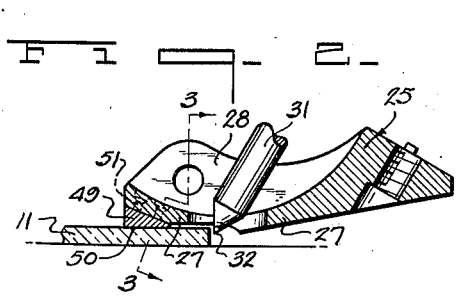
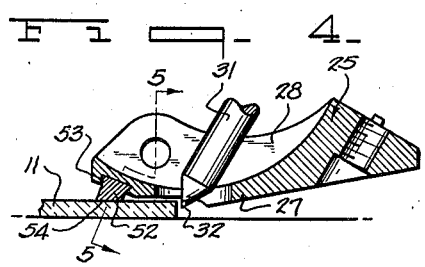
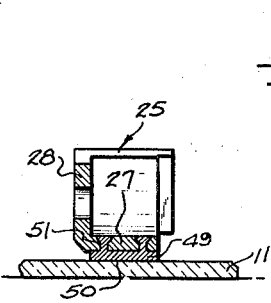
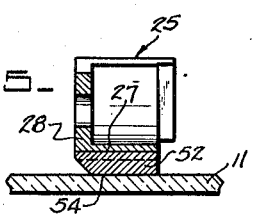
Inventor
HARRY C. SHOCK.
By Frank Fraser
Attorney Patented Dec. 28, 1937

2,103,875

UNITED STATES PATENT OFFICE 2,103,875

CUTTING MECHANISM

Harry C. Shock, Charleston, W. Va., assignor to Libbey-Owens-Ford Glass Company, Toledo, Ohio, a corporation of Ohio Application September 12, 1936, Serial No. 100,439

4 Claims. (Cl. 33—32)

This invention relates to apparatus for cutting flat glass and constitutes an improvement upon the cutting mechanism disclosed in the patent to E. A. Rosin, No. 1,970,919, issued August 21, 1934.

In the above-identified patent, there is disclosed a machine for cutting glass sheets or plates into a plurality of smaller sizes as required to obtain true edges, effect the elimination of defects, or both. This machine was designed to do away with the operation of hand cutting and to effect either a single cutting operation or a plurality of cutting operations simultaneously whereby the time required for cutting up a sheet of glass is materially reduced and the effort on the part of the operator correspondingly lessened.

Briefly, the machine of the patent embodies a horizontal reciprocating cutting table for supporting the glass sheets to be cut and a cutting mechanism mounted thereabove, said cutting mechanism being stationary and the table being movable back and forth therebeneath. The cutting mechanism includes a plurality of cutting units preferably spaced one inch apart throughout the width of the table and, as disclosed in the patent, are actuated by the operator through the medium of a keyboard positioned at the front of the machine. The keyboard comprises a plurality of keys, one being provided for and operatively associated with each cutter so that the said cutters are independently movable at all times into and out of cutting position.

Each cutting unit comprises a substantially L-shaped lever pivotally mounted intermediate its ends and comprising a substantially horizontal tool supporting arm and a substantially vertical arm. Secured to the substantially horizontal arm is a cutter bracket or foot of hard metal carrying a cutter holder provided with a cutting diamond, while the substantially vertical arm has associated therewith electro-magnets which control the pivotal rocking of the L-shaped lever to effect movement of the diamond into cutting position.

With the construction shown in the patent, however, the cutting diamond, upon leaving the edge of the glass sheet, drops downwardly with the result that the cutter bracket strikes the upper surface of the sheet with such force as to frequently cause chipping or spalling of the glass, and the aim of the present invention is to overcome this objection by the provision of novel means for preventing the hard metal cutter bracket from striking the glass sheet upon dropping of the cutting diamond and in this way reduce to a minimum the jar or shock caused by the impact of the bracket upon the glass.

Another object of the invention is the provision of a buffer block of relatively soft metal associated with the cutter bracket for resisting or deadening the shock of concussion between the said bracket and glass sheet upon dropping of the cutting tool as it leaves the edge of said sheet to the end that chipping or spalling of the glass will be eliminated.

Other objects and advantages of the invention will become more apparent during the course of the following description when taken in connection with the accompanying drawing.

In the drawing wherein like numerals are employed to designate like parts throughout the same, Fig. 1 is a side elevation of a cutting unit embodying the invention;

Fig. 2 is a longitudinal vertical sectional view through the cutter bracket or shoe showing the means provided by the invention for preventing the said cutter bracket or shoe from striking the glass sheet when the cutting diamond leaves the edge of said sheet;

Fig. 3 is a vertical sectional view taken substantially on line 3—3 of Fig. 2;

Fig. 4 is a view similar to Fig. 2 but showing a slightly modified arrangement; and Fig. 5 is a vertical sectional view taken substantially on line 5—5 of Fig. 4.

There has been illustrated in the drawing and will be described herein only those portions of the cutting mechanism which are necessary to a complete understanding of the present invention, and for a more detailed disclosure of the machine reference may be had to the above-mentioned patent.

In the drawing, the numeral 10 designates the cutting table for supporting the glass sheet 11 to be cut and above which is mounted the cutting mechanism designated in its entirety by the numeral 12. The cutting table is adapted to be reciprocated back and forth beneath the cutting mechanism which is mounted in a relatively fixed position thereabove. While this arrangement is preferable and while it is also preferred to use a diamond as the cutting tool, it is to be understood that the specification and claims are deemed to include the equivalent apparatus in which a rotatable steel wheel is used as the cutting tool and in which the cutting mechanism is caused to reciprocate while the table is maintained stationary.

The cutting mechanism 12 includes a station-

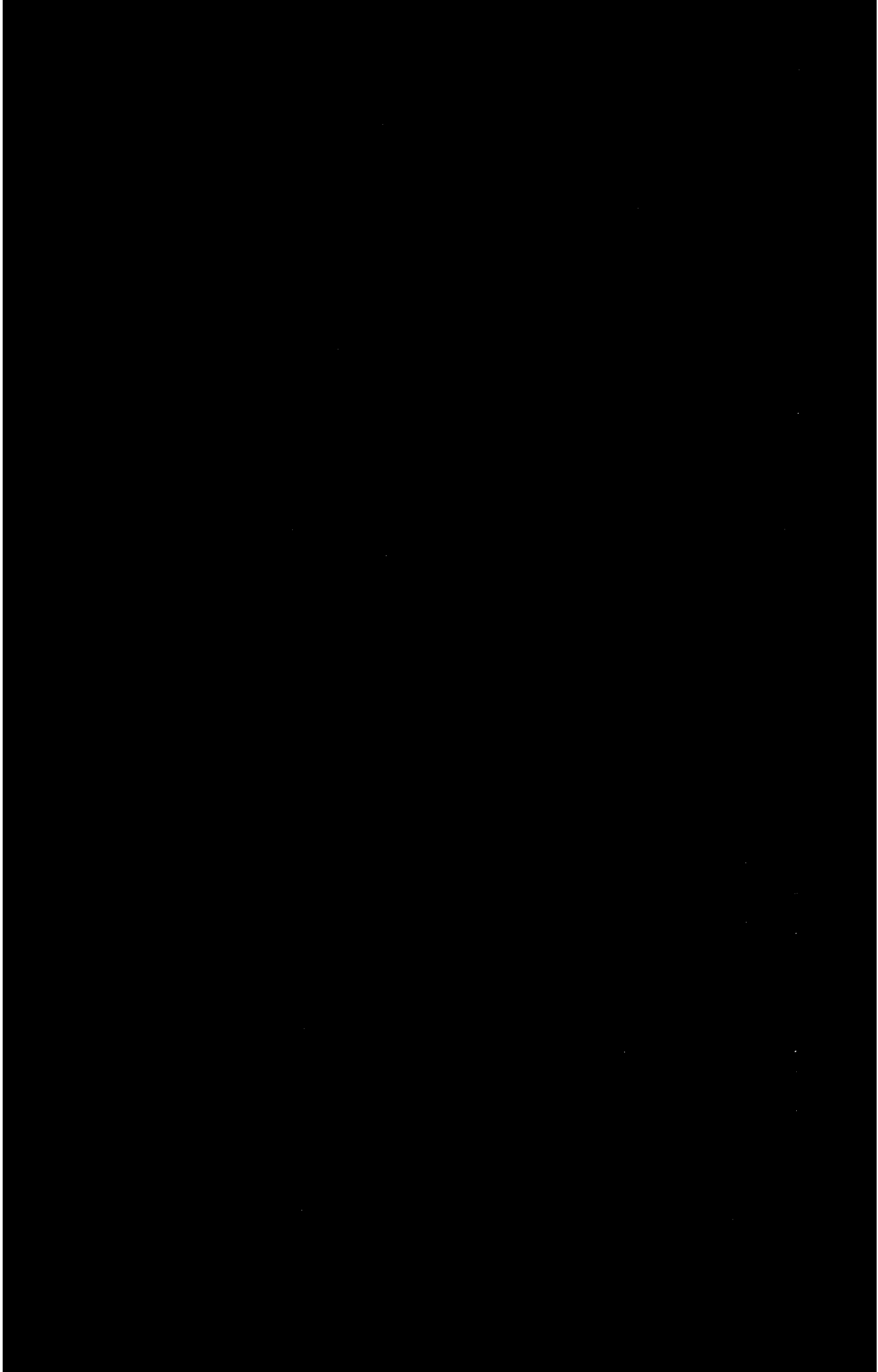

In Figs. 4 and 5 is shown a buffer block 52 which is of the same character as buffer block 49, the principal difference being in the manner in which it is secured to the cutter bracket 25. Thus, in this instance, the bottom 27 of the bracket is provided with a transverse undercut groove or slot 53 into which the buffer block 52 is dovetailed. The purpose and advantages of the buffer block 52 are the same as those of buffer block 49 and it will be seen that the block 52 also has a relatively wide flat bottom surface 54 which lies flat upon the glass sheet when the cutting diamond passes beyond the edge thereof and the said diamond and cutter bracket drop downwardly.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for cutting glass sheets, cutting mechanism including a pivotally mounted lever, a bracket carried by said lever, a cutting tool carried by said bracket, and means for preventing the said bracket from striking the glass sheet upon downward movement thereof when the cutting tool leaves the edge of said sheet.

2. In apparatus for cutting glass sheets, cutting mechanism including a pivotally mounted lever, a bracket carried by said lever, a cutting tool carried by said bracket, and means for resisting or deadening the shock of concussion between the said bracket and glass sheet upon dropping of the cutting tool as it leaves the edge of said sheet.

3. In apparatus for cutting glass sheets, cutting mechanism including a pivotally mounted lever, a bracket carried by said lever, a cutting tool carried by said bracket, and buffer means carried by said bracket and adapted to engage the glass sheet when the cutting tool leaves the edge of said sheet to prevent the said bracket from striking the glass.

4. In apparatus for cutting glass sheets, cutting mechanism including a pivotally mounted lever, a bracket carried by said lever, a cutting tool carried by said bracket, and a buffer block of relatively soft metal carried by said bracket and adapted to engage the glass sheet upon dropping of the cutting tool as it leaves the edge of said sheet thereby preventing the said bracket from striking the glass.

HARRY C. SHOCK.